United States Patent
Tanaka et al.

(10) Patent No.: US 11,002,546 B2
(45) Date of Patent: May 11, 2021

(54) SYSTEMS AND METHODS FOR DETERMINING A LOCATION OF A VEHICLE WITHIN A STRUCTURE

(71) Applicant: Toyota Connected North America, Inc., Plano, TX (US)

(72) Inventors: Toshikazu Tanaka, Allen, TX (US); Brian M. Kursar, Fairview, TX (US); Akshata Dundi Mohan, Addison, TX (US); Nimish Kumar Amlathe, Plano, TX (US); Raja Shekar Kilaru, Addison, TX (US); Christian Gilles Claudel, Austin, TX (US)

(73) Assignee: Toyota Connected North America, Inc., Plano, TX (US)

( * ) Notice: Subject to any disclaimer, the term of this patent is extended or adjusted under 35 U.S.C. 154(b) by 101 days.

(21) Appl. No.: 16/376,724

(22) Filed: Apr. 5, 2019

(65) Prior Publication Data
US 2020/0318970 A1    Oct. 8, 2020

(51) Int. Cl.
G01C 21/14 (2006.01)
B60W 40/107 (2012.01)
G06T 11/20 (2006.01)
G07C 5/02 (2006.01)

(52) U.S. Cl.
CPC .......... *G01C 21/14* (2013.01); *B60W 40/107* (2013.01); *G06T 11/20* (2013.01); *G07C 5/02* (2013.01); *B60W 2520/105* (2013.01); *B60W 2552/15* (2020.02); *B60W 2555/40* (2020.02)

(58) Field of Classification Search
None
See application file for complete search history.

(56) References Cited

U.S. PATENT DOCUMENTS

| | | | |
|---|---|---|---|
| 6,028,550 A * | 2/2000 | Froeberg | G01C 21/28 342/357.29 |
| 6,381,540 B1 | 4/2002 | Beason et al. | |
| 8,498,793 B1 | 7/2013 | Loomis | |
| 9,086,285 B2 | 7/2015 | Gupta et al. | |
| 9,478,134 B2 | 10/2016 | Narayanan et al. | |

(Continued)

FOREIGN PATENT DOCUMENTS

| DE | 102014111574 A1 | 2/2016 |
|---|---|---|
| DE | 102016207710 A1 | 11/2017 |

OTHER PUBLICATIONS

Bonnedahl, Road Slope Estimation Using a Longitudinal Accelerometer and Kalman Filtering, accessed at http://lup.lub.lu.se/student-papers/record/8847441 (Apr. 2010).

*Primary Examiner* — Tamara L Weber
(74) *Attorney, Agent, or Firm* — Christopher G. Darrow; Darrow Mustafa PC

(57) ABSTRACT

System, methods, and other embodiments described herein relate to determining a location of a vehicle within a structure. In one embodiment, a method includes collecting, from at least one sensor in the vehicle, sensor data that indicates information associated with control of the vehicle in the structure. The method includes classifying gradients along a path of the vehicle through the structure according to the sensor data. The method includes identifying traversed levels of the structure along the path according to the gradients. The method includes providing the location including at least an indicator of the traversed levels as an electronic output.

20 Claims, 6 Drawing Sheets

(56) References Cited

U.S. PATENT DOCUMENTS

| | | |
|---|---|---|
| 9,644,970 B2 | 5/2017 | Sun et al. |
| 2011/0077898 A1* | 3/2011 | Loomis ................ G01C 21/12 |
| | | 702/141 |
| 2012/0265437 A1 | 10/2012 | Schaminee |
| 2013/0253731 A1* | 9/2013 | Kanou ..................... B60T 7/12 |
| | | 701/1 |
| 2018/0275277 A1 | 9/2018 | Li et al. |

* cited by examiner

SYSTEMS AND METHODS FOR DETERMINING A LOCATION OF A VEHICLE WITHIN A STRUCTURE

TECHNICAL FIELD

The subject matter described herein relates, in general, to determining a location of a vehicle within a structure, and, more particularly, to estimating a level within the structure using telematics data.

BACKGROUND

Navigation systems such as Global Positioning Systems (GPS) generally function by using signals from multiple satellites to calculate a position of a receiving device in three-dimensional space. This precisely resolved location can be useful in combination with a map to locate the device (e.g., a vehicle) and provide additional layers of service such as navigation, location-based information, and so on. However, the signals from the satellites are relatively weak because of various characteristics such as distance, available power, etc. Therefore, a receiving device can generally resolve the weak signals when views of the satellites are unobstructed.

When the views are obstructed by buildings in an urban corridor, a tunnel, or parking structure, then the receiving device may be unable to adequately resolve the signals, and, therefore, may be unable to determine a location. This may be especially problematic in the instance of a parking structure with many levels. That is, even though a parking structure may include labels of levels and sections to help identify where a vehicle parks, people routinely still forget exact locations especially on which floor. Additionally, even in instances where the receiving device may resolve a portion of the weak GPS signals to determine a rough location (e.g., within 10 m), such resolution does not provide for the determination of a level of the parking structure on which the vehicle parks. Consequently, the noted systems are generally not reliable for determining locations when a vehicle enters such structures.

SUMMARY

Example systems and methods disclosed herein relate to determining a location of a vehicle in a structure. As previously noted, location information about a vehicle within a structure such as a multi-level garage is generally unavailable when relying on GPS information, which can frustrate location-sensitive services (e.g., parking reminders, etc.) that rely on knowledge of the location of the vehicle.

Therefore, in one embodiment, a location system is disclosed that infers the vertical location (i.e., a floor/level) of the vehicle when in a structure by using information from sources other than a satellite-based system such as GPS. For example, in one approach, the location system collects sensor data from available sensors in the vehicle that provide information about how the vehicle is being controlled along a path through the structure. In general, the sensor data characterizes, for example, accelerations of the vehicle when traveling through the structure and up and/or down ramps between levels of the structure. Because the accelerations of the vehicle generally correlate with ramps to transition between levels of the structure, the location system, in one embodiment, identifies gradients along a path of the vehicle from the estimated accelerations to infer the presence of ramps.

The location system uses the determinations of gradients at separate instances along the path to identify the traversed levels (e.g., ramps) by correlating portions of the traveled path with corresponding gradients that, for example, match that of a ramp. Consequently, the location system, in one embodiment, infers how many levels the vehicle traverses, and, in one approach, also a direction (e.g., ascending or descending) of the traversal in the structure. In this way, the location system provides for resolving a vertical location (e.g., floor) of a vehicle within a structure where other approaches fail because of a lack of information. Therefore, the location system improves the ability of an operator to locate the vehicle and to receive other services based on the availability of the location of the vehicle. Moreover, the location system can generally provide the location without the use of, for example, additional sensors such as altimeters, gradient sensors, and so on thereby providing a more robust approach to determining the location.

In one embodiment, a location system for determining a location of a vehicle within a structure is disclosed. The location system includes one or more processors and a memory communicably coupled to the one or more processors. The memory stores a communication module including instructions that when executed by the one or more processors cause the one or more processors to collect, from at least one sensor in the vehicle, sensor data that indicates information associated with control of the vehicle in the structure. The memory stores a gradient module including instructions that when executed by the one or more processors cause the one or more processors to classify gradients along a path of the vehicle through the structure according to the sensor data. The gradient module includes instructions to identify traversed levels of the structure along the path according to the gradients. The communication module includes instructions to provide the location including at least an indicator of the traversed levels as an electronic output.

In one embodiment, a non-transitory computer-readable medium for determining a location of a vehicle within a structure and including instructions that when executed by one or more processors cause the one or more processors to perform various functions. The instructions including instructions to collect, from at least one sensor in the vehicle, sensor data that indicates information associated with control of the vehicle in the structure. The instructions include instructions to classify gradients along a path of the vehicle through the structure according to the sensor data. The instructions include instructions to identify traversed levels of the structure along the path according to the gradients. The instructions include instructions to provide the location including at least an indicator of the traversed levels as an electronic output.

In one embodiment, a method for determining a location of a vehicle within a structure is disclosed. In one embodiment, the method includes collecting, from at least one sensor in the vehicle, sensor data that indicates information associated with control of the vehicle in the structure. The method includes classifying gradients along a path of the vehicle through the structure according to the sensor data. The method includes identifying traversed levels of the structure along the path according to the gradients. The method includes providing the location including at least an indicator of the traversed levels as an electronic output.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
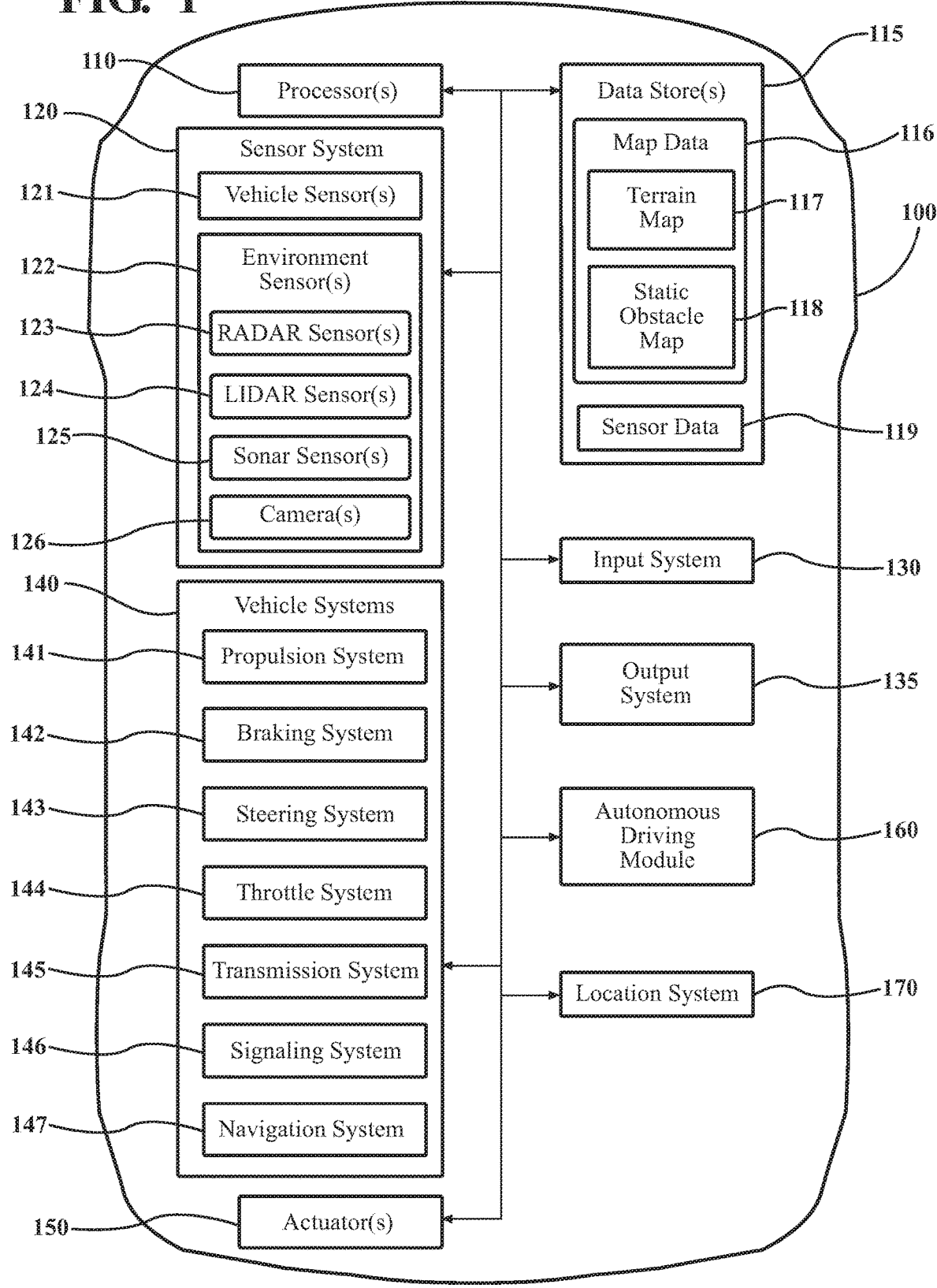
FIG. 1 illustrates one embodiment of a vehicle within which systems and methods disclosed herein may be implemented.

Systems, methods, and other embodiments associated with determining a location of a vehicle in a structure are described herein. As previously noted, location identifying systems such as GPS generally do not function in circumstances where a direct line of sight to the associated satellites is unavailable. Accordingly, location information for a vehicle or other device is likely to be unavailable upon entering a structure such as a multi-level parking garage. This can be especially true in relation to vertical location information within the structure since resolving height is generally a finer determination of location within the context of a GPS system that uses signals from several satellites. As such, location information about a vehicle within a structure, such as a multi-level garage, is generally unavailable when relying on GPS information, which can result in difficulties remembering a vehicle location in addition to frustrating other location-sensitive services that rely on knowledge of the vehicle location.

Therefore, in one embodiment, a location system is disclosed that infers the vertical location (i.e., a floor/level) of the vehicle when in a structure using information from sources other than a satellite-based system such as GPS. For example, in one approach, the location system collects sensor data from available sensors in the vehicle that provide information about how the vehicle is being controlled along a path through the structure. The sensors can include a brake pedal sensor, an accelerator pedal sensor (e.g., pressure sensors), etc. In general, the sensor data characterizes, for example, accelerations of the vehicle when traveling through the structure and up and/or down ramps between levels of the structure. Thus, the location system uses the sensor data to estimate accelerations from which the location system can further infer gradients on which the vehicle is traveling. That is, because the accelerations of the vehicle generally correlate with ramps to transition between levels of the structure, the location system, in one embodiment, identifies the gradients from the estimated accelerations, and, thus, also the presence of ramps corresponding to the gradients.

Accordingly, in one approach, the location system collects and analyzes the sensor data from brake and accelerator pedal pressure sensors from which the location system estimates the accelerations. In various approaches, the location system acquires the sensor data as part of telematics data collected about the vehicle. That is, the vehicle may collect the telematics data from a set of sensors throughout the vehicle. The telematics data can include information associated with various systems of the vehicle about current operating conditions including, for example, engine operation, braking systems, safety systems, passenger compartment climate systems, navigation systems, and so on. In general, the telematics data includes, in one or more embodiments, any information about the vehicle for which a sensor or other data collection mechanism is collecting data. Additionally, in further aspects, the vehicle includes a communication subsystem that communicates the telematics data to a remote device (e.g., cloud-based system). Thus, in various approaches, the location system may be located remotely from the vehicle as a cloud-based system, locally within the vehicle, or a combination of the two.

In either case, the telematics data does not, for example, include explicit information about accelerations of the vehicle to use a basis for determining the gradients along a path. That is, while some vehicles may include accelerometers, the accuracy, and precision of the accelerometers are not sufficient to accurately calculate the gradient. Moreover, the telematics data also does not generally include information from a gradient sensor or other gradient indicating device, or, when available, at least not of a sufficient accuracy/precision from which to infer the presence of a ramp in the structure.

Thus, the location system acquires the sensor data from which the characteristics of the path of the vehicle through the structure can at least be inferred. From the sensor data, the location system identifies gradients at separate instances in time along a path of the vehicle according to the estimated accelerations. The location system uses the determinations of gradients at the separate instances to classify the traversed levels (e.g., ramps) by identifying portions of the traveled path with corresponding gradients that, for example, match that of a ramp. Consequently, the location system, in one embodiment, collects and analyzes the sensor data about at least the control inputs of the vehicle along the traveled path to infer how many levels the vehicle traverses, and, in one embodiment, a direction (e.g., ascending or descending) of the traversal in the structure.

In one approach, the location system combines the identified level of the vehicle with other location identifying information (e.g., dead reckoning data) to identify a location of the vehicle in the structure both vertically and in a horizontal plane. The location system can provide the location to a mobile device of an operator, to a third-party service provider, or to other interested parties as permitted. In this way, the location system provides for resolving a vertical location (e.g., floor) of a vehicle within a structure where other approaches fail because of a lack of information. Consequently, the location system improves the ability of an operator to locate the vehicle and to receive other services based on the availability of the location of the vehicle. Moreover, the location system can generally provide the location without the use of, for example, additional sensors such as altimeters, gradient sensors, and so on.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, operates within a structure, and thus benefits from the functionality discussed herein.

The vehicle 100 also includes various elements. It will be understood that in various embodiments it may not be necessary for the vehicle 100 to have all of the elements shown in FIG. 1. The vehicle 100 can have various combination of the different elements shown in FIG. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a location system 170 that functions to collect and analyze sensor data from various sensors in the vehicle 100 in order to identify a location (e.g., at least a vertical level) of the vehicle 100 within a structure. Moreover, while depicted as a standalone component, in one or more embodiments, the location system 170 is integrated with one or more other components (e.g., a navigation system 147) of the vehicle 100, as a remote (e.g., cloud-based) system, or as a combination of remote and local components. The noted functions and methods will become more apparent with a further discussion of the figures.

Figure 2:
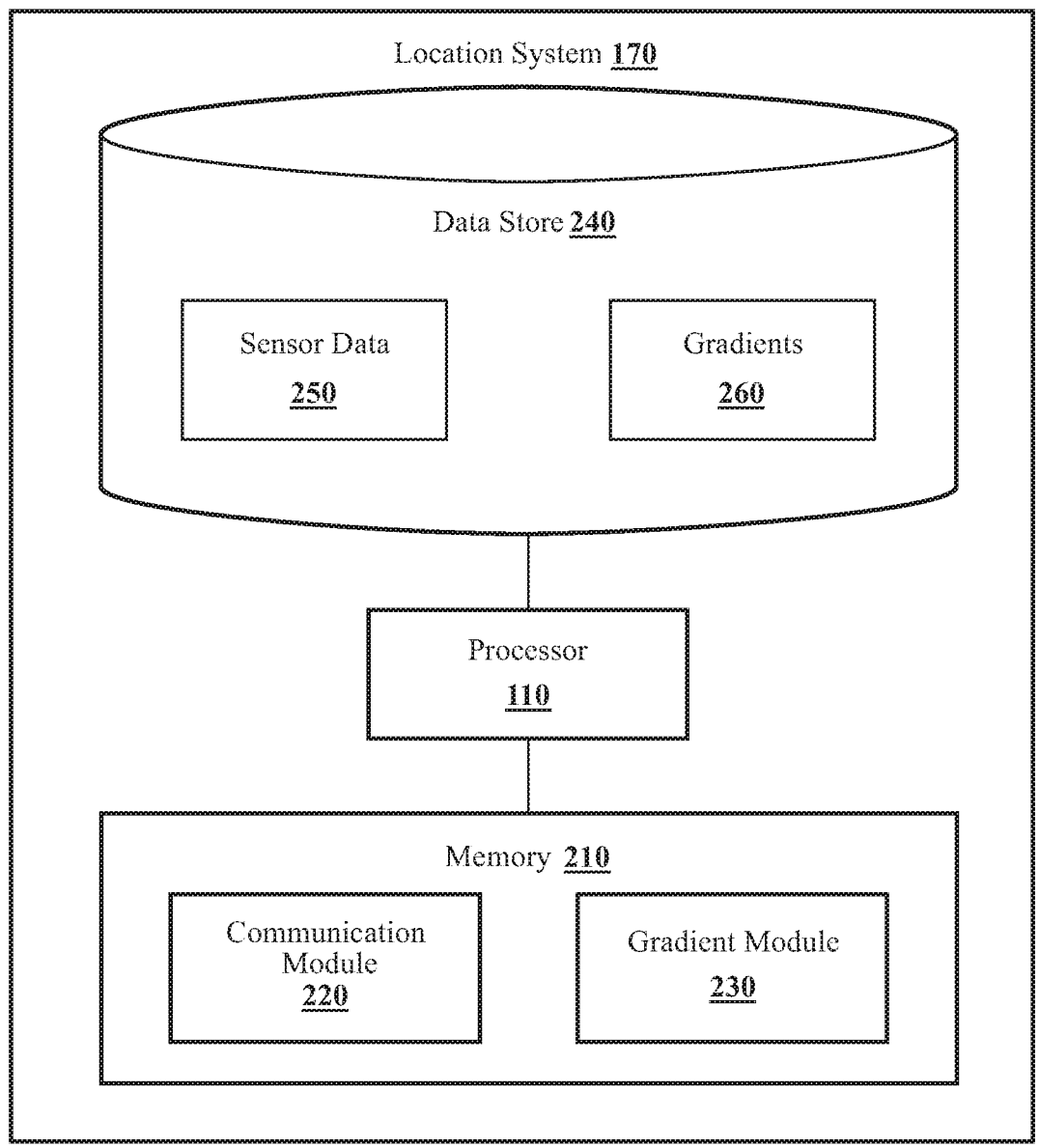
FIG. 2 illustrates one embodiment of a location system that is associated with determining at least a vertical location of a vehicle in a structure.

With reference to FIG. 2, one embodiment of the location system 170 is further illustrated. As shown, the location system 170 is shown as including a processor 110. Accordingly, the processor 110 may be a part of the location system 170 or the location system 170 may access the processor 110 through a data bus or another communication path. In one or more embodiments, the processor 110 is an application specific integrated circuit that is configured to implement functions associated with a communication module 220 and a gradient module 230. In general, the processor 110 is an electronic processor such as a microprocessor that is capable of performing various functions as described herein. In one embodiment, the location system 170 includes a memory 210 that stores the communication module 220 and the gradient module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein.

Furthermore, in one embodiment, the location system 170 includes a data store 240. The data store 240 is, in one embodiment, an electronic data structure stored in the memory 210 or another storage device for storing data. In one embodiment the data store 240 is a database that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes sensor data 250, gradients 260, along with, for example, other information (e.g., statistical models) that is used by the modules 220 and 230.

Accordingly, the communication module 220 generally includes instructions that function to control the processor 110 to acquire data inputs from one or more sensors of the vehicle 100 that form the sensor data 250. As previously noted, the sensor data 250 embodies data from one or more sensors or data generating mechanisms (e.g., an electronic controller) of the vehicle 100. In various embodiments, the sensor data 250 includes information about how the vehicle 100 is being controlled along a path through a structure (e.g., inside of a multi-level parking garage). In general, the sensor data 250 characterizes, for example, accelerations of the vehicle 100 when traveling through the structure and up and/or down ramps between levels of the structure.

The sensors can include a brake pedal sensor, an accelerator pedal sensor, etc. In one embodiment, the pedal sensors are data collection points that monitor inputs from a physical pedal in the vehicle and/or an electronic input produced via one or more systems of the vehicle 100. The location system 170 may be implemented to use multiple sensors of the vehicle 100 including the noted brake/accelerator pedal sensors in addition to, for example, speedometer and/or other sensors (e.g., controller area network (CAN) sensors) associated with the functioning of the vehicle systems 140 (e.g., navigation system 147, throttle system 144, transmission system 145, etc.) In one approach, the communication module 220 acquires information from at least the brake pedal sensor, the accelerator pedal sensor, and an engine RPM sensor. However, it should be appreciated that the disclosed approach can be extended to cover further configurations of sensors not explicitly detailed herein that provide information about the acceleration of the vehicle (e.g., transmission sensors, etc.).

In either case, the communication module 220, in one embodiment, controls the respective sensors to provide the data inputs in the form of the sensor data 250. Additionally, while the communication module 220 is discussed as controlling the various sensors to provide the sensor data 250, in one or more embodiments, the communication module 220 employs other techniques that are either active or passive to acquire the sensor data 250. For example, the communication module 220 may passively sniff the sensor data 250 from a stream of electronic information provided by the various sensors to further components within the vehicle 100 and/or external to the vehicle 100.

Additionally, in various approaches, the communication module 220 acquires the sensor data 250 as part of telematics data collected about the vehicle 100. That is, the communication module 220 or another module may collect the telematics data from a set of sensors (e.g., controller area network (CAN) sensors) throughout the vehicle 100. The telematics data can include information associated with various systems of the vehicle about current operating conditions including, for example, engine operation, braking systems, safety systems, passenger compartment climate systems, navigation systems, acceleration, and so on. In general, the telematics data can include, in one or more embodiments, any information about the vehicle for which a sensor or other data collection mechanism is collecting data. Additionally, in further aspects, the vehicle 100 includes a communication subsystem that communicates the telematics data to a remote device (e.g., cloud-based system). Thus, in various approaches, the location system 170 may be located remotely from the vehicle 100 as a cloud-based system, locally within the vehicle 100, or as a combination of the two.

In either case, the telematics data does not, for example, include explicit information about accelerations of the vehicle 100 to use a basis for determining the gradients 260 along a path as discussed herein. That is, while some vehicles may include accelerometers, the accuracy, and precision of the accelerometers is not sufficient in regards to accuracy/precision to calculate the gradient within the level of certainty to infer levels of a structure. Moreover, the telematics data also does not generally include information from a gradient sensor or other gradient indicating device or, when available, at least not of a sufficient accuracy/precision from which to infer the presence of a ramp in the structure. Thus, the communication module 220 acquires the sensor data 250 from sensors that provide information about characteristics of the path of the vehicle 100 that are indicative of the ramp/levels of the structure through applied inferences.

Moreover, while the communication module 220 is generally discussed as collecting/acquiring the sensor data 250, in one embodiment, the communication module 220 includes instructions that function to collect the sensor data 250 responsive to one or more occurrences. That is, for example, the communication module 220 monitors various conditions associated with the vehicle 100 such as, in one or more embodiments, a current location of the vehicle 100 according to a satellite-based locating system (e.g., GPS), a current state of the vehicle 100 (e.g., engine on/off), pending electronic requests for a location of the vehicle, and so on.

Accordingly, depending on the particular approach, the communication module 220, for example, initiates the collection of the sensor data 250 in response to the determination of an occurrence (e.g., entering a parking garage), and, thus, may not continuously collect the sensor data 250 otherwise. That is, for example, in one embodiment, the communication module 220 monitors a location of the vehicle 100 relative to parking garages and/or other known structures in which the vehicle 100 may not be able to acquire a GPS-based location. Accordingly, the communication module 220, in one approach, monitors for the location of the vehicle 100 passing a threshold (e.g., a perimeter of a structure) as defined by the location of the structure (e.g., from map data 116) and begins to collect the sensor data 250 responsive thereto. In further aspects, the communication module 220 annotates the sensor data 250 upon detecting entry into a parking garage when, for example, the sensor data 250 is otherwise collected (e.g., semi-continuously) without regard to a specific location.

In alternative arrangements, the communication module 220 acquires/collects the sensor data 250 by retrieving the sensor data 250 from a data store (e.g., data store 250) that is local or remote to the location system 170. For example, responsive to detecting the vehicle 100 has been turned off and, thus, is parked, responsive to a request for a location of the vehicle 100 (e.g., from a mobile app on an electronic device), or another condition (e.g., switching transmission into park), the communication module 220 acquires/collects the sensor data 250 from a data store within the vehicle or a remote storage location. In further aspects, the communication module 220 considers the noted occurrences in combination with one or more further conditions such as a proximity of the vehicle 100 to a structure (e.g., multi-level parking garage) in order to trigger the collection of the sensor data 250.

In further aspects subsequent to, for example, execution of functions of the gradient module 230 as discussed in greater detail hereinafter, the communication module 220 provides the location of the vehicle 100. In one embodiment, the communication module 220 provides the location as at least an indicator of the traversed levels of the structure. That is, the gradient module 230 generally produces determinations of how many levels in the structure the vehicle 100 traverses according to, for example, correlations between the sensor data 250 and ramps within the structure. Thus, the communication module 220, in one arrangement, provides the determination of the traversed levels.

The communication module 220, in further aspects, provides the location as a combination of the traversed levels and additional location data. For example, while the traversed levels provide an indicator of vertical location within the structure, a horizontal location may be provided as well. Thus, the communication module 220, for example, combines the traversed levels with dead reckoning data (e.g., from navigation system 147) to specify the location relative to the point of entry into the structure in both a vertical and horizontal approximation. In further aspects, the communication module 220 or another component of the system 170 derives the horizontal component from a weak GPS fix (e.g., within 10 m) from signals of fewer satellites or using another manner of approximating the location without comprehensive GPS information.

Moreover, with further reference to FIG. 2, in one embodiment, the gradient module 230 generally includes instructions that function to control the processor 110 to identify traversed levels of the structure along the path of the vehicle 100. For example, in one embodiment, the gradient module 230 uses the sensor data 250 to estimate an acceleration of the vehicle 100 at separate instances in time. The separate instances in time can generally correspond with data rates of the associated sensors (e.g., every 200 ms).

Of course, in further embodiments, the separate instances or data points used by the gradient module 230 to perform the determination may be adjusted according to various pre-processing functions to smooth the sensor data 250 or otherwise account for aberrations (e.g., vehicle stops) in the data. Thus, in various approaches, the gradient module 230 approximates missing data points through a best-fit interpolation or other approach in order to provide, for example, a consistent set of data over which to assess the gradients 260. Moreover, the gradient module 230 may also remove data points from various aberrations (e.g., vehicle stopping for traffic) according to additional information derived from the sensor data (e.g., engine rpm). The gradient module 230 may also perform further adjustments to account for gear shifts of the transmission (e.g., via changes in engine rpm) that may influence inputs for braking and accelerating upon which the estimated acceleration is derived.

In either case, the gradient module 230 analyzes the sensor data 250 at separate instances that are generally regular intervals, although, in one embodiment, the intervals may be irregular depending on, for example, the availability of the sensor data 250. The intervals of the sensor data 250 may align with actual inputs or may be interpolated as needed. In either case, the gradient module 230, in one embodiment, estimates an acceleration of the vehicle 100 at the separate instances. Moreover, the separate instances generally correspond with separate positions along a path of the vehicle 100 as the vehicle 100 travels through the structure.

In one embodiment, the gradient module 230 uses a set of models to estimate the acceleration of the vehicle 100 according to the sensor data 250. The set of models are, in one approach, statistical models, parametric models, or another model that correlates the noted sensor data 250 with longitudinal acceleration. Accordingly, the gradient module 230 defines the set of models to include, as one possibility, three separate models that correspond with separate configurations of the sensor data 250. For example, the three models can include a first model for when a brake input that is other than zero, a second model for when an accelerator input is other than zero, and a third model for when both an accelerator input and a brake input are zero or are at least substantially equal to zero. As specified previously, the brake input and the accelerator input can be sensed pressure on the respective physical pedals within the vehicle, an electronic input from one or more systems of the vehicle (e.g., autonomous driving module 160), or a combination of the two.

Accordingly, the gradient module 230, in one embodiment, estimates the longitudinal acceleration at the separate instances by determining which input, if any, is present and then applying the corresponding model. In some instances, the gradient module 230 may be configured to blend outputs for two or more models depending on the sensor data 250. For example, when braking and acceleration are applied together, the gradient module 230 may blend outputs from the two models together and/or apply an additional correcting figure to account for such a circumstance. However, in general, application of the accelerator and the brake simultaneously is an outlier condition that does not occur with much frequency. As a further example, the gradient module 230 may apply two or more of the models when the various inputs are nonzero but remain relatively close to zero. In either case, the gradient module 230 includes logic to account for various combinations of the sensor data 250.

Continuing with the models, the gradient module 230, in one approach, defines the first model to characterize the longitudinal acceleration of the vehicle 100 when a braking input is present. In one embodiment, the first model includes multiplying a value of the braking input by a first defined constant value that is particular to the vehicle 100 to calculate the acceleration. The gradient module 230, in one embodiment, defines the second model to characterize the longitudinal acceleration of the vehicle 100 when an accelerator input is present. In one embodiment, the second model includes multiplying a value of the accelerator input by defined second constant value that is particular to the vehicle 100 to calculate the acceleration. The second model may further include additional factors to account for gear shifts and a baseline offset. The factor for accounting for the gear shifts may depend, in one approach, on a ratio of engine rpm to a current speed of the vehicle 100. Furthermore, in one embodiment, the gradient module 230 defines the third model to characterize the longitudinal acceleration of the vehicle 100 when neither a braking input nor an accelerator input is present. In one embodiment, the third model includes multiplying a current speed of the vehicle 100 by a defined third constant value that is particular to the vehicle 100 to calculate the acceleration. The third model may further include an additional offset value that is added to the calculated acceleration. In general, the noted constant values and factors represent, for example, statistically identified values that correlate the inputs with the acceleration.

Figure 3:
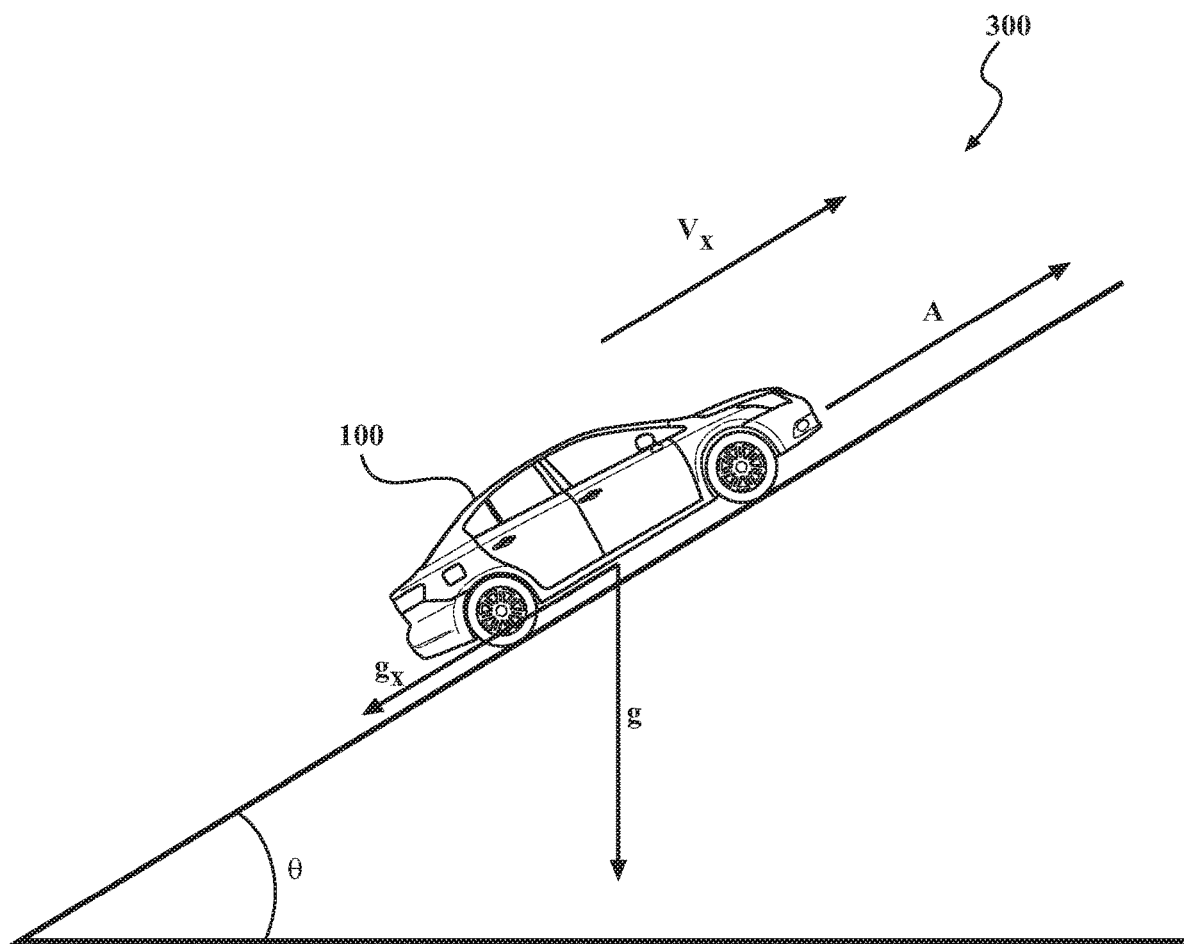
FIG. 3 is a diagram illustrating one approach to estimating a gradient from an acceleration of a vehicle.

Accordingly, the gradient module 230, in one approach, iteratively estimates the longitudinal acceleration of the vehicle 100 for the sensor data 250 that is available at the separate instances. Using the longitudinal acceleration values for the separate instances, the gradient module 230, in one approach, calculates the gradients for the separate instances. For example, consider FIG. 3, which illustrates a diagram 300 of the vehicle 100 driving on a gradient/slope. As illustrated in FIG. 3, the various components include A=longitudinal acceleration, $v_x$=velocity along the plane of the road/ramp, g=acceleration due to gravity, $g_x$= acceleration due to gravity component along the plane, and Θ=road gradient.

$$\sin\theta = \frac{g_x}{g} \quad \text{(Eq. 1)}$$

$$A = v'_x - g_x \quad \text{(Eq. 2)}$$

$$g_x = v'_x - A \quad \text{(Eq. 3)}$$

$$\sin\theta = \frac{v'_x - A}{g} \quad \text{(Eq. 4)}$$

Therefore, the gradient module 230 uses the estimated longitudinal acceleration, as previously explained, and the velocity (i.e., current speed) to determine the road gradient (Θ) at the separate instances along the path of the vehicle 100. In one approach, the gradient module 230 iteratively calculates the gradients 260 for the separate instances. Thus, the gradient module 230 produces the gradients 260 as numeric values estimating a corresponding gradient/slope of the path traversed by the vehicle 100.

The gradient module 230, in one embodiment, further functions to classify the gradients of the separate instances. For example, the gradient module 230, in one embodiment, classifies the gradients according to incline, decline, and level/no gradient. In one approach, the gradient module 230 classifies the calculated gradients according to defined thresholds corresponding to the separate categories. That is, the gradient module 230, in one approach, defines an incline according to a threshold greater than x degrees where x is, in one example, +0.5 degrees. Similarly, the gradient module 230, in one approach, defines a decline according to a separately defined threshold that is less than y degrees where y is, in one example, −0.5 degrees. In one embodiment, the gradient module 230 smooths gradient values for separate instances that do not satisfy the thresholds. For example, when a gradient is between +0.5 and −0.5, the gradient module 230 adjusts the value to zero and identifies the associated instance as corresponding with a level gradient.

Of course, in various embodiments, the thresholds may be defined differently (e.g., 0.7 degrees to −0.9 degrees for incline and decline respectively) and/or the gradient module 230 implements dynamic thresholds that are, for example, specific to particular parking garages. Thus, the values for the separate thresholds may be provided as part of map data and associated with the particular parking structures. Accordingly, the gradient module 230 may retrieve the thresholds upon, for example, identifying an associated parking structure the vehicle 100 is present within or about to enter. In either case, the gradient module 230 classifies the gradients for the separate instances (i.e., sensor data points) to characterize gradients along a path of the vehicle 100 in the structure. Thus, the gradient module 230, in one approach, may store the separate labels classifying the gradients in a data structure that corresponds with the separate instances in time along the path of the vehicle 100. In this way, a character of the path in relation to the slope/gradient is indicated for the separate instances to provide, for example, a fine-grained assessment of the gradient.

As such, the gradient module 230, in one arrangement, analyzes the gradients along the path to determine whether portions of the path correspond with a ramp in the structure that is indicative of a traversed level. Furthermore, the gradient module 230 can also assign a direction of travel for the traversed levels as ascending (i.e., incline) or descending (i.e., decline). In one approach, the gradient module 230 analyzes consecutive segments of the gradients to determine whether the classified portions correlate with an actual ramp or not along the path in the structure. Generally speaking, ramps within parking structures have a length that is sufficient at the prescribed gradient to achieve a transition in height to convey the vehicle 100 between levels, i.e., traverses levels. Thus, the gradient module 230 identifies portions along the path with consecutive gradients classified as inclines or declines in order to identify whether the classified gradients correspond with traversed levels or not. For example, in one approach, the gradient module 230 smooths separate instances along the path that include identified gradients. That is, where a portion of consecutive gradients occur, the gradient module 230, in one embodiment, averages the values of the gradients and labels the corresponding instances with the average gradient and the associated gradient type (e.g., incline, decline, level) in order to smooth the representation of a ramp within the data. In this way, the gradient module 230 can group the classified gradients and count how many levels the vehicle traverses and in what direction to determine a floor/level for the vehicle 100 relative to a point of entry into the structure.

In a further embodiment, the gradient module 230 further calculates a height associated with each traversed level in order to, for example, confirm the gradient section from the path actually corresponds to a ramp in the structure. That is, the gradient module 230, in one approach, uses speed data and time data that corresponds with the data points (e.g., sensor data 250) for the sections of gradients in order to determine an overall height that the vehicle 100 traversed by driving along the gradient. This additional determination can provide a verification of the presence of the ramp in addition to, for example, determining a height of the structure, whether the vehicle 100 parked midway up a ramp, and so on.

In either case, the gradient module 230 provides the determination of the traversed levels to, for example, the communication module 220, which formulates the traversed levels into an electronic output. The electronic output can take different forms depending on a particular approach, but may include a location that includes the traversed levels alone, a location with additional locating information (e.g., dead reckoning data), a visual rendering of the path followed by the vehicle 100 through the structure, or another form of conveying the traversed levels. In this way, the location system 170 improves locating the vehicle 100 within structures and thereby improves associated services that rely on precise determinations of location for the vehicle 100.

Figure 4:
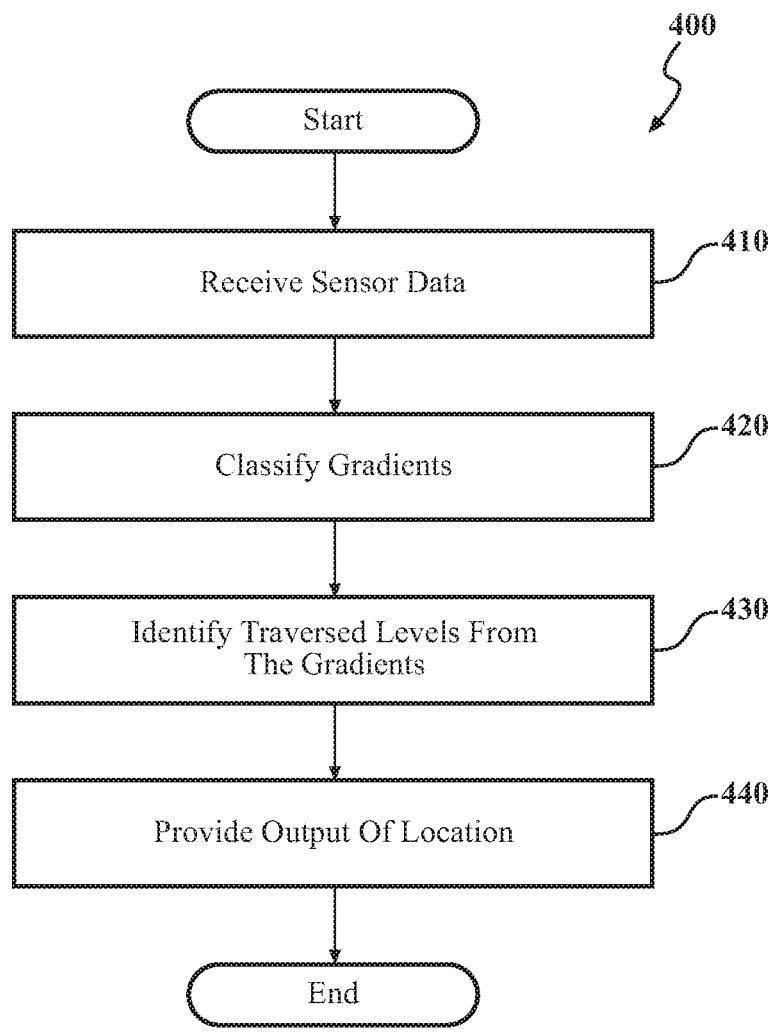
FIG. 4 illustrates one embodiment of a method associated with using estimated gradients to determine the location of a vehicle.

Additional aspects of selectively intervening in manual control of a vehicle will be discussed in relation to FIG. 4. FIG. 4 illustrates a flowchart of a method 400 that is associated with determining a location of the vehicle 100 within a structure. Method 400 will be discussed from the perspective of the location system 170 of FIGS. 1-2. While method 400 is discussed in combination with the location system 170, it should be appreciated that the method 400 is not limited to being implemented within the location system 170 but is instead one example of a system that may implement the method 400.

As an initial point regarding the instantiation and performance of the method 400, in various embodiments, the separate functions can be executed according to different conditions/occurrences. As noted previously, in one approach, the location system 170 collects the sensor data 250 and performs the other noted functions in response to detecting the vehicle 100 has entered a structure. However, in further aspects, the system 170 may at least semi-continuously collect the sensor data 250 and either determine the traversed levels in real-time or, for example, subsequently to being parked in response to an electronic request for the location. In either case, the following description is provided for purposes of illustration and, thus, the particular arrangement of the noted functions is provided as one example. It should be appreciated that further arrangements (e.g., parallel execution) of the various functions are within the scope of the present disclosure.

At 410, the communication module 220 collects the sensor data 250 that indicates information associated with control of the vehicle in the structure. In one embodiment, the sensor data 250 includes braking inputs, acceleration inputs, a current speed, and engine RPM of the vehicle 100. In general, the communication module 220 collects the sensor data 250 via physical sensors in the vehicle 100 such as controller area network (CAN) sensors. In further arrangements, the communication module 220 collects one or more aspects of the sensor data 250 from data collection points (e.g., a data logging module) within the vehicle 100 or at a remote/cloud-based location (e.g., telematics data collection point). In either case, the communication module 220 collects the sensor data 250 to provide a particular set of information that the location system 170 can leverage to provide determinations of traversed levels of a structure.

At 420, the gradient module 230 classifies the gradients 260 along a path of the vehicle 100 through the structure. In one embodiment, the gradient module 230 determines the gradients 260 at separate instances along the path using the sensor data 250 according to the previously noted models and the equations (1)-(4).

For example, the gradient module 230 initially estimates the longitudinal acceleration using at least the braking inputs and the accelerator inputs from the sensor data 250. As previously specified, the gradient module 230 can use the noted information as inputs to the set of models to estimate the acceleration at the separate instances along the path. It should be noted, that while the estimation of the acceleration and the classifying of the gradients is discussed as occurring after the collection of sensor data 250, in one approach, the processes may occur in parallel. That is, as the communication module 220 collects additional sensor data 250 of a subsequent instance, the gradient module 230 determines the gradient of the prior instance, and so on. As such, the system 170, in one approach, executes functions associated with blocks 410 and 420 in parallel.

In either case, the gradient module 230 uses the estimated acceleration produced by applying the set of models to determine the gradient at the particular instance along the path. Using EQ (4), the gradient module 230 calculates the gradient. Once the gradient module 230 determines the gradient, the gradient module 230, for example, classifies the gradient according to the determined value. Thus, the gradient module 230, in one approach, compares the determined gradients 260 with defined thresholds for the separate categories (e.g., incline, level, decline) to determine whether the separate instances correspond to a gradient. As such, the gradient module 230 classifies the gradients using, for example, annotations at the separate instances along the path according to a type of gradient (e.g., incline, level, decline).

At 430, the gradient module 230 identifies traversed levels of the structure along the path according to the gradients. In one embodiment, the gradient module 230 analyzes the gradients 260 along the path to determine whether portions of the path correspond with a ramp in the structure that is indicative of one of the traversed levels. In general, the gradient module 230 identifies a threshold number of instances with, for example, similar gradients (e.g., incline or decline) to determine the presence of a traversed level along the path. Moreover, the gradient module 230 further identifies a direction of travel for the vehicle 100 as ascending or descending according to corresponding annotation labels of the separate instances. In this way, the gradient module 230 infers the presence of traversed levels corresponding to ramps in the structure along the path of the vehicle 100 without the use of satellite-based location information or specific sensors (e.g., gradient sensors or accelerometers).

At 440, the communication module 220 provides the location including at least an indicator of the traversed levels as an electronic output. In one embodiment, the communication module 220 electronically communicates the location to a mobile device (e.g., smartphone of the operator, electronic device of a delivery person, etc.) in response to a request for the location of the vehicle 100. Additionally, or alternatively, in one embodiment, the communication module 220 renders the location including the traversed levels as a graphic depicting the path of the vehicle 100. The communication module 220 may cause the graphic to be displayed within the vehicle 100, on a display of a mobile device that is separate from the vehicle 100, or on another display. In any case, the graphic generally provides a visual assessment of the location of the vehicle relative to the entry point to the structure. Thus, in one approach, the graphic is a three-dimensional representation of the path.

In still further aspects, the communication module 220 combines the traversed levels with, for example, an estimate of horizontal location within the structure as derived from dead reckoning data via the navigation system 147. Accordingly, the communication module 220, in one embodiment, provides the location relative to a point of entry into the structure and including the traversed levels as a relative indicator of a floor in the structure with the dead reckoning data providing an estimated horizontal location. In this way, the location system 170 improves determinations of locations for the vehicle 100 when the vehicle is located within a structure such as a multi-level parking garage.

Additionally, as used herein, the term "structure" generally refers to a building in which a vehicle can travel, and that has multiple levels that the vehicle may traverse through the use of ramps (i.e., inclined/declined driving lanes) therebetween. In various examples, the structure is a multi-level parking garage that includes "switch-back" ramps and/or spiral ramps.

Figure 5:
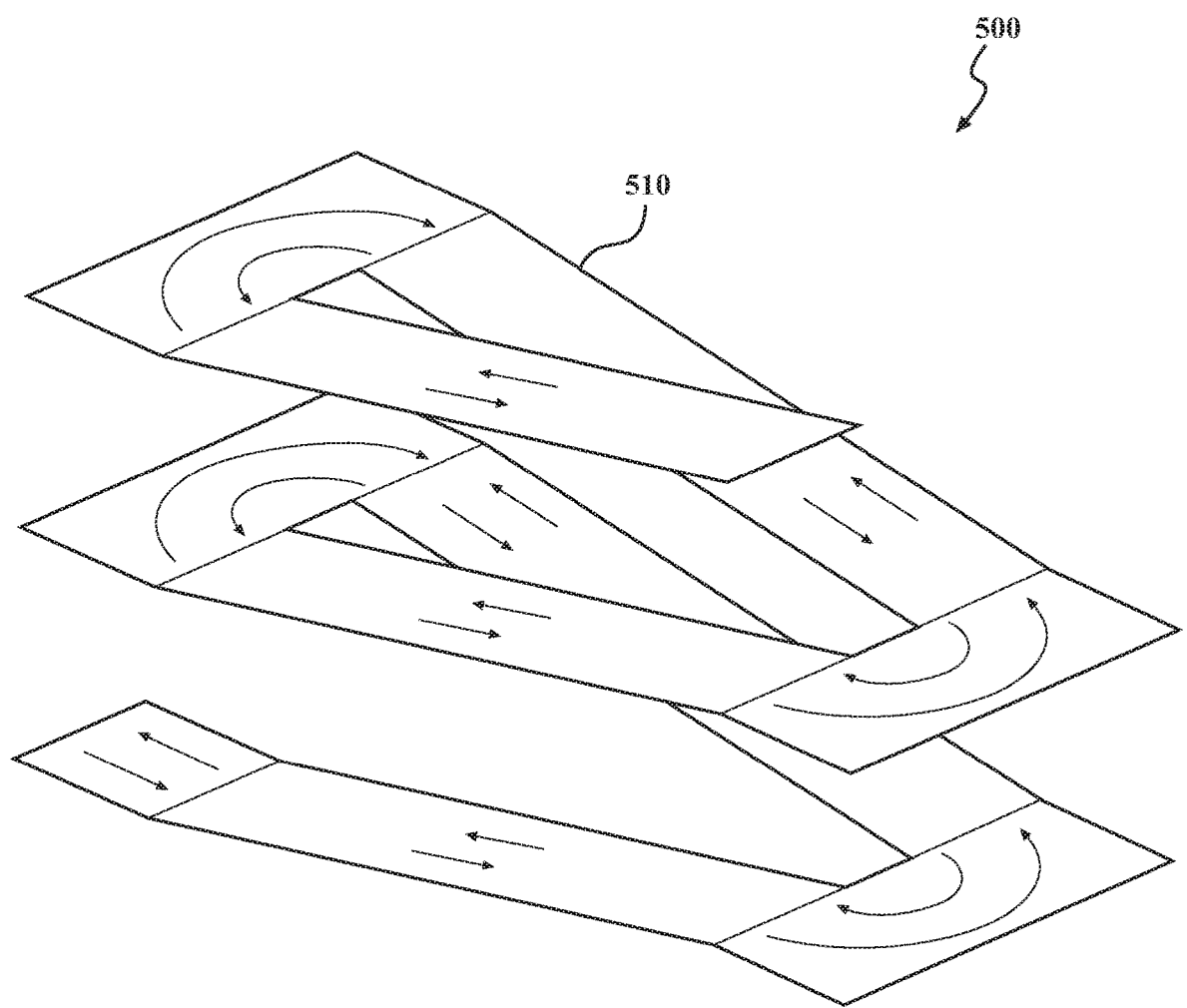
FIG. 5 is a diagram illustrating one example of ramps between separate levels of a structure.
Figure 6:
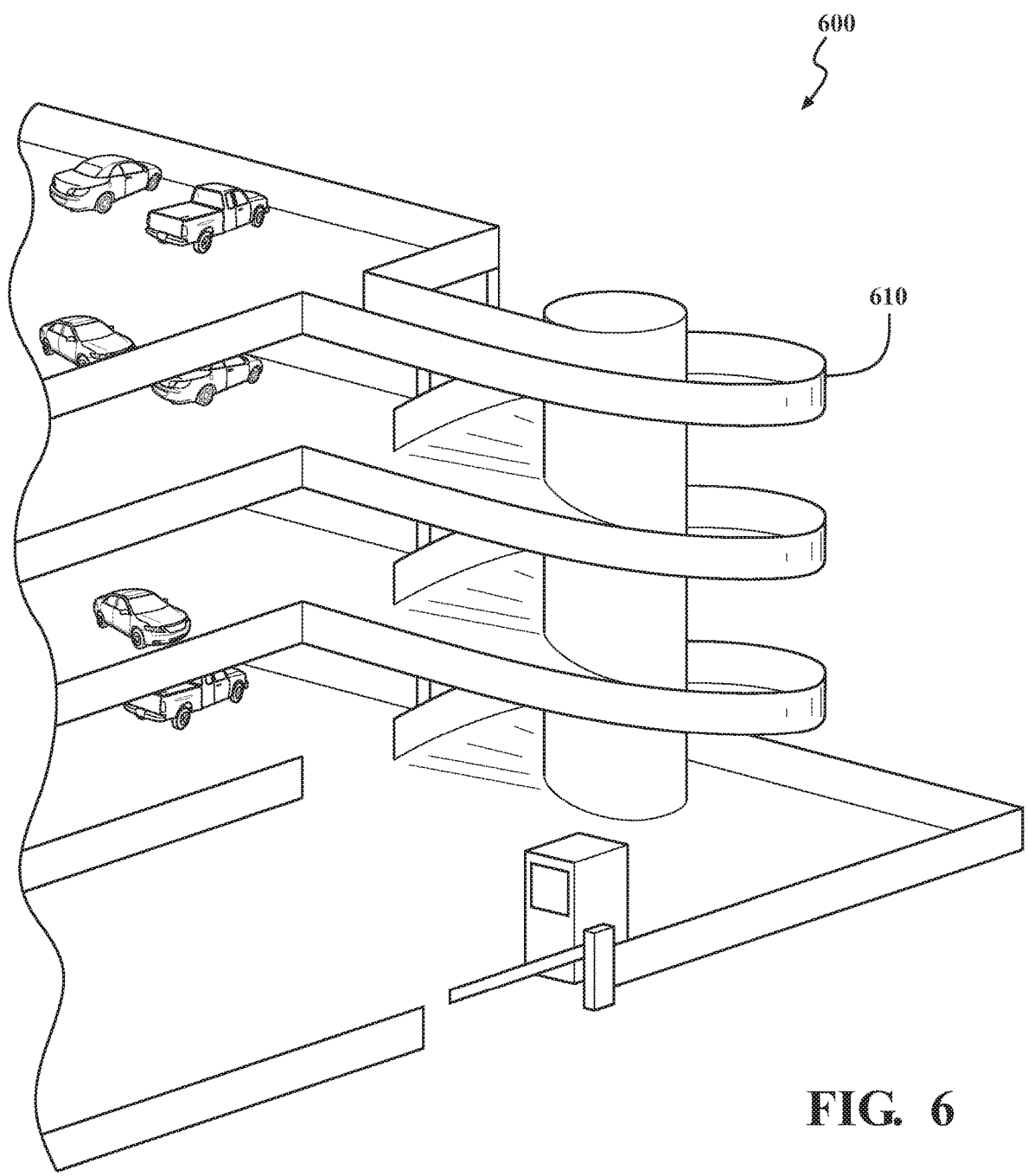
FIG. 6 is a diagram illustrating another example of ramps between separate levels of a structure.

By way of example, consider FIGS. 5 and 6. FIG. 5 illustrates a structure 500 that includes a segmented or "switch-back" type of ramp 510 that may be found in a multi-level parking garage. As shown, the ramp 510 transitions between six different levels of a structure. Accordingly, representative sensor data collected by the location system 170 about the ramp 510 would likely exhibit a pattern of level/gradient/level classifications for the gradients as the vehicle 100 progresses up the ramp 510.

As a further example, FIG. 6 illustrates a structure 600 that includes a spiral ramp 610. As illustrated, the spiral ramp 610 is generally continuous without level transitions between floors of the structure 600. Thus, in one approach, the location system 170 may perform an additional analysis of the incline/decline portion of the path to determine a length of the incline/decline and/or a height transitioned over the incline/decline portion. Thus, the location system 170 can use the additional information to estimate how many traversed levels are present between a beginning and end of the incline/decline portion since there is no explicit indicator as in the case of the ramp 510 of FIG. 5 that is segmented according to level gradients.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the autonomous driving module 160 to ensure the vehicle 100 remains within defined constraints/boundaries of, for example, a roadway.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger/operator (e.g., a person via an integrated or mobile device).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the location system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the location system 170, and/or the autonomous driving module(s) 160 may control some or all of these vehicle systems 140 and, thus, may be partially or fully autonomous.

The processor(s) 110, the location system 170, and/or the autonomous driving module(s) 160 can be operatively connected to communicate with the various vehicle systems 140 and/or individual components thereof. For example, returning to FIG. 1, the processor(s) 110, the location system 170, and/or the autonomous driving module(s) 160 can be in communication to send and/or receive information from the various vehicle systems 140 to control the movement, speed, maneuvering, heading, direction, etc. of the vehicle 100. The processor(s) 110, the location system 170, and/or the autonomous driving module(s) 160 may control some or all of these vehicle systems 140.

The processor(s) 110, the location system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the location system 170, and/or the autonomous driving module(s) 160 can control the direction and/or speed of the vehicle 100. The processor(s) 110, the location system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. For instance, the one or more actuators 150 can be used to support the noted functions and can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the location system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the gradient module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A location system for determining a location of a vehicle within a structure, comprising:
   one or more processors;
   a memory communicably coupled to the one or more processors and storing:
   a communication module including instructions that when executed by the one or more processors cause the one or more processors to collect, from at least one sensor in the vehicle, sensor data that indicates information associated with control of the vehicle in the structure, wherein the sensor data identifies braking inputs and acceleration inputs for controlling the vehicle; and
   a gradient module including instructions that when executed by the one or more processors cause the one or more processors to:
   classify gradients along a path of the vehicle through the structure according to the sensor data, including instructions to estimate an acceleration of the vehicle according to the braking inputs and the acceleration inputs and classify the gradients using the acceleration derived from the braking inputs and the acceleration inputs, and
   identify traversed levels of the structure along the path according to the gradients,
   wherein the communication module includes instructions to provide the location including at least an indicator of the traversed levels as an electronic output.

2. The location system of claim 1, wherein the gradient module includes instructions to classify the gradients including instructions to:
   i. estimate the acceleration of the vehicle at separate instances along the path according to the sensor data, and
   ii. determine whether the acceleration for respective ones of the separate instances corresponds to a gradient.

3. The location system of claim 2, wherein the gradient module includes instructions to estimate the acceleration of the vehicle at the separate instances including instructions to apply a set of models to the sensor data according to available inputs of the sensor data to estimate the acceleration at the separate instances,
   wherein the communication module includes instructions to collect the sensor data including instructions to iteratively collect the sensor data at the separate instances along the path, and
   wherein the gradient module includes instructions to classify the gradients including instructions to classify the gradients at the separate instances.

4. The location system of claim 1, wherein the gradient module includes instructions to classify the gradients including instructions to calculate the gradients from the sensor data and determine whether the gradients satisfy defined thresholds corresponding to an incline and a decline, and
   wherein the structure is a multi-level parking garage.

5. The location system of claim 1, wherein the gradient module includes instructions to identify the traversed levels including instructions to analyze the gradients along the path to determine whether portions of the path correspond with a ramp in the structure that is indicative of one of the traversed levels and a direction of travel for the traversed levels as ascending or descending.

6. The location system of claim 1, wherein the communication module includes instructions to provide the location including instructions to combine the traversed levels with dead reckoning data to specify the location relative to a point of entry into the structure and including the traversed levels as a relative indicator of a floor in the structure, and
   wherein the gradient module includes instructions to classify the gradients and identify the traversed levels in response to determining the vehicle has entered the structure.

7. The location system of claim 1, wherein the communication module includes instructions to receive a signal to determine a level in a structure of the vehicle, wherein the signal is responsive to one or more of: the vehicle entering the structure, the vehicle parking, and a request from a secondary device.

8. The location system of claim 1, wherein the communication module includes instructions to provide the location including instructions to perform at least one of: electronically communicating the location to a mobile device in response to a request for the location of the vehicle, and rendering the location including the traversed levels as a graphic depicting the path.

9. A non-transitory computer-readable medium for determining a location of a vehicle within a structure and including instructions that when executed by one or more processors cause the one or more processors to:
   collect, from at least one sensor in the vehicle, sensor data that indicates information associated with control of the vehicle in the structure, wherein the sensor data identifies braking inputs and acceleration inputs for controlling the vehicle;
   classify gradients along a path of the vehicle through the structure according to the sensor data, including estimating an acceleration of the vehicle according to the braking inputs and the acceleration inputs and classifying the gradients using the acceleration derived from the braking inputs and the acceleration inputs;
   identify traversed levels of the structure along the path according to the gradients; and
   provide the location including at least an indicator of the traversed levels as an electronic output.

10. The non-transitory computer-readable medium of claim 9, wherein the instructions to classify the gradients include instructions to:
    i. estimate the acceleration of the vehicle at separate instances along the path according to the sensor data, and
    ii. determine whether the acceleration for respective ones of the separate instances corresponds to a gradient.

11. The non-transitory computer-readable medium of claim 10, wherein the instructions to estimate the acceleration of the vehicle at the separate instances along the path include instructions to apply a set of models to the sensor data according to available inputs of the sensor data to estimate the acceleration at the separate instances, wherein the instructions to collect the sensor data include instructions to iteratively collect the sensor data at the separate instances along the path, and wherein the instructions to classify the gradients include instructions to classify the gradients at the separate instances.

12. The non-transitory computer-readable medium of claim 9, wherein the instructions to classify the gradients include instructions to calculate the gradients from the sensor data and determine whether the gradients satisfy defined thresholds corresponding to an incline and a decline, and wherein the structure is a multi-level parking garage.

13. The non-transitory computer-readable medium of claim 9, wherein the instructions to identify the traversed levels include instructions to analyze the gradients along the path to determine whether portions of the path correspond with a ramp in the structure that is indicative of one of the traversed levels and a direction of travel for the traversed levels as ascending or descending.

14. A method of determining a location of a vehicle within a structure, comprising:

collecting, from at least one sensor in the vehicle, sensor data that indicates information associated with control of the vehicle in the structure, wherein the sensor data identifies braking inputs and acceleration inputs for controlling the vehicle;

classifying gradients along a path of the vehicle through the structure according to the sensor data, including estimating an acceleration of the vehicle according to the braking inputs and the acceleration inputs and classifying the gradients using the acceleration derived from the braking inputs and the acceleration inputs;

identifying traversed levels of the structure along the path according to the gradients; and providing the location including at least an indicator of the traversed levels as an electronic output.

15. The method of claim 14, wherein classifying the gradients includes:

i. estimating the acceleration of the vehicle at separate instances along the path according to the sensor data, and ii. determining whether the acceleration for respective ones of the separate instances corresponds to a gradient.

16. The method of claim 15, wherein estimating the acceleration of the vehicle at the separate instances along the path includes applying a set of models to the sensor data according to available inputs of the sensor data to estimate the acceleration at the separate instances, wherein collecting the sensor data includes iteratively collecting the sensor data at the separate instances along the path, and wherein classifying the gradients includes classifying the gradients at the separate instances.

17. The method of claim 14, wherein classifying the gradients includes calculating the gradients from the sensor data and determining whether the gradients satisfy defined thresholds corresponding to an incline and a decline, and wherein the structure is a multi-level parking garage.

18. The method of claim 14, wherein identifying the traversed levels includes analyzing the gradients along the path to determine whether portions of the path correspond with a ramp in the structure that is indicative of one of the traversed levels and a direction of travel for the traversed levels as ascending or descending.

19. The method of claim 14, wherein providing the location includes combining the traversed levels with dead reckoning data to specify the location relative to a point of entry into the structure and including the traversed levels as a relative indicator of a floor in the structure, and wherein classifying the gradients and identifying the traversed levels occurs in response to determining the vehicle has entered the structure.

20. The method of claim 14, further comprising:

receiving a signal to determine a level in a structure of the vehicle, wherein the signal is responsive to one or more of: the vehicle entering the structure, the vehicle parking, and a request from a secondary device, and wherein providing the location includes at least one of: electronically communicating the location to a mobile device in response to a request for the location of the vehicle, and rendering the location including the traversed levels as a graphic depicting the path.

* * * * *